United States Patent
Bozek et al.

(10) Patent No.: US 7,599,964 B1
(45) Date of Patent: Oct. 6, 2009

(54) BRIDGE MANAGER TOOL FOR PROBLEM MANAGEMENT

(75) Inventors: John C. Bozek, Kansas City, MO (US); Clinton W. Fountain, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 247 days.

(21) Appl. No.: 11/261,185

(22) Filed: Oct. 28, 2005

(51) Int. Cl.
*G06F 7/00* (2006.01)
*G06F 17/00* (2006.01)
(52) U.S. Cl. .................................. 707/104.1
(58) Field of Classification Search ............. 707/1, 707/100, 104.1; 711/1, 100, 200
See application file for complete search history.

(56) References Cited

U.S. PATENT DOCUMENTS

| 6,801,610 | B1 * | 10/2004 | Malik | 379/202.01 |
|---|---|---|---|---|
| 2002/0169649 | A1 * | 11/2002 | Lineberry et al. | 705/8 |
| 2005/0165616 | A1 * | 7/2005 | Ellis et al. | 705/1 |
| 2006/0046732 | A1 * | 3/2006 | Grossman et al. | 455/450 |

OTHER PUBLICATIONS http://web.archive.org/web/20041010165156/www.virtualboss.net/screenshots/calendar.htm Nov. 26, 2007 12:35:06 PM.*
http://web.archive.org/web/20041010174856/www.virtualboss.net/screenshots/ganttchartoptions.htm (1 of 2)Nov. 26, 2007 12:11:32 PM.*
http://web.archive.org/web/20041010115713/www.virtualboss.net/pda/pocketscreenshots.htm (1 of 10)Nov. 26, 2007 12:02:11 PM.*
http://web.archive.org/web/20041012163858/www.virtualboss.net/screenshots/tasklistscreen.htm (1 of 2)Nov. 26, 2007 12:07:55 PM.*
http://web.archive.org/web/20041012164759/www.virtualboss.net/screenshots/workorder.htm (3 of 3)Nov. 26, 2007 5:03:14 PM.*
http://web.archive.org/web/20041017021504/www.virtualboss.net/moreinfo.htm (1 of 2)Nov. 26, 2007 12:40:48 PM.*
http://web.archive.org/web/20041012173905/www.virtualboss.net/whatsnew.htm (1 of 7)Nov. 27, 2007 9:52:51 AM.*
http://web.archive.org/web/20041012162905/www.virtualboss.net/screenshots/taskdetailscreen.htmNov. 26, 2007 3:34:40 PM.*

(Continued)

*Primary Examiner*—Wilson Lee
*Assistant Examiner*—Nicholas E Allen

(57) ABSTRACT

A computer-implemented bridge manager tool is provided including a checklist component, a timer component, an application launching component, a note taking component, a paging component, a database component, a documentation access component, and a graphical interface. The checklist component is operable to itemize tasks related to a problem managed via the bridge manager tool. The timer component is operable to track a time aspect related to the problem managed via the bridge manager tool. The application launching component is operable to launch one or more applications external to the bridge manager tool. The note taking component is operable to document events related to a problem managed via the bridge manager tool. The paging component is operable to send a page to an individual or group and the database component is operable to store data related to a problem managed via the bridge manager tool.

20 Claims, 18 Drawing Sheets

OTHER PUBLICATIONS http://web.archive.org/web/20041013011600/www.virtualboss.net/screenshots/printanddistribute.htm (1 of 2)Nov. 26, 2007 3:01:37 PM.* http://web.archive.org/web/20041011055934/www.virtualboss.net/screenshots/calendaroptions.htmNov. 26, 2007 12:32:14 PM.* http://web.archive.org/web/20041010173553/www.virtualboss.net/screenshots/ganttchart.htm (1 of 2)Nov. 26, 2007 5:57:42 PM.* http://web.archive.org/web/20041010175100/www.virtualboss.net/screenshots/jobmanagerscreen.htm (1 of 2)Nov. 26, 2007 2:55:17 PM.*

* cited by examiner

BRIDGE MANAGER TOOL FOR PROBLEM MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to problem management, and more particularly, but not by way of limitation, to systems, tools, and methods running a bridge with a bridge manager tool.

BACKGROUND OF THE INVENTION

In a business enterprise, systems and processes may be developed to handle problems that arise, such as service outages, delays in manufacturing processes, and other issues that require resolution in a timely manner. For example in telecommunications systems, often resolution of such problems involves numerous departments or individuals working together, each contributing a portion of the solution. The involvement of numerous departments or individuals creates the further issue that problem resolution processes and documentation may be handled differently throughout an organization, depending on individual preferences or styles. Additionally, proper tracking of problem solutions in a data management system is a problem for many business enterprises.

In a business enterprise, an incident manager may be assigned to manage a problem and all of the various individuals and problem solving tools involved in resolving the problem and documenting the resolution. An incident manager may be responsible for paging necessary parties, organizing documentation needed for resolving the problem, passing information to executives, setting/meeting deadlines, and other activities involved in facilitating the group responsible for resolving a problem.

A bridge is one tool that may be used in incident management. A bridge is a conference call (or series of calls) that involves some or all of the parties necessary to resolution of the subject problem. A bridge may be used by an incident manager to organize and facilitate on-going activities aimed at resolving the problem and documenting the steps taken to resolve the problem. The incident manager may use various tools to facilitate resolution of problems.

SUMMARY OF THE INVENTION

Systems and methods for problem management and running a bridge are provided. Some embodiments provide a computer-implemented bridge manager tool comprising several components. The bridge manager tool includes a checklist component operable to itemize tasks related to a problem managed via the bridge manager tool. The bridge manager tool also includes a timer component operable to track a time aspect related to a problem managed via the bridge manager tool. The bridge manager tool further comprises an application launching component operable to launch applications external to the bridge manager tool. Also, the bridge manager tool includes a note taking component operable to document events related to a problem managed via the bridge manager tool and a paging component operable to send a page to an individual or group. The bridge manager tool additionally includes a database component operable to store data related to a problem managed via the bridge manager tool, data related to the status of the problem, and historical data and a documentation access component operably coupled to the database component for input and storage of new data related to a problem managed via the bridge manager tool, the status, and reference to historical data. The bridge manager tool further comprises a graphical interface operable to display the checklist component, the timer component, the application launching component, the note taking component, the paging component and the documentation access component.

Various embodiments of the present disclosure provide a method of problem management. The method of problem management may include receiving a report of a problem and launching a bridge manager tool for centralized coordination of problem resolution activities. The method may further comprise initiating centralized coordination of one or more pre-resolution activities to resolve the problem through the bridge manager tool and initiating centralized coordination of one or more active resolution activities to resolve the problem through the bridge manager tool. In various embodiments, the method further includes paging one or more individuals involved in resolution of the problem through the bridge manager tool. In still further embodiments, the method further comprises performing one or more tasks listed on a problem resolution checklist, documenting the tasks as they are performed, and flagging one or more tasks if not performed within a predetermined period of time. The method of problem management may also include launching one or more applications external to the bridge manager tool for problem resolution, and centrally documenting the pre-resolution activities and active resolution of the problem through the bridge manager tool.

Still other embodiments of the present disclosure provide a system comprising a processor for processing instructions, a memory circuit containing the instructions; the memory circuit coupled to the processor, a mass storage device for holding a program operable to transfer the program to the memory circuit, wherein the program on the mass storage device comprises instructions for a method of problem management. The method of the program on the mass storage device may comprise receiving a report of a problem and launching a bridge manager tool for centralized coordination of problem resolution activities. The method of the program on the mass storage device may further include initiating centralized coordination of one or more pre-resolution activities to resolve the problem through the bridge manager tool and initiating centralized coordination of one or more active resolution activities to resolve the problem through the bridge manager tool. The method of the program additionally comprises centrally documenting the pre-resolution activities and active resolution of the problem through the bridge manager tool.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

Figure 1:
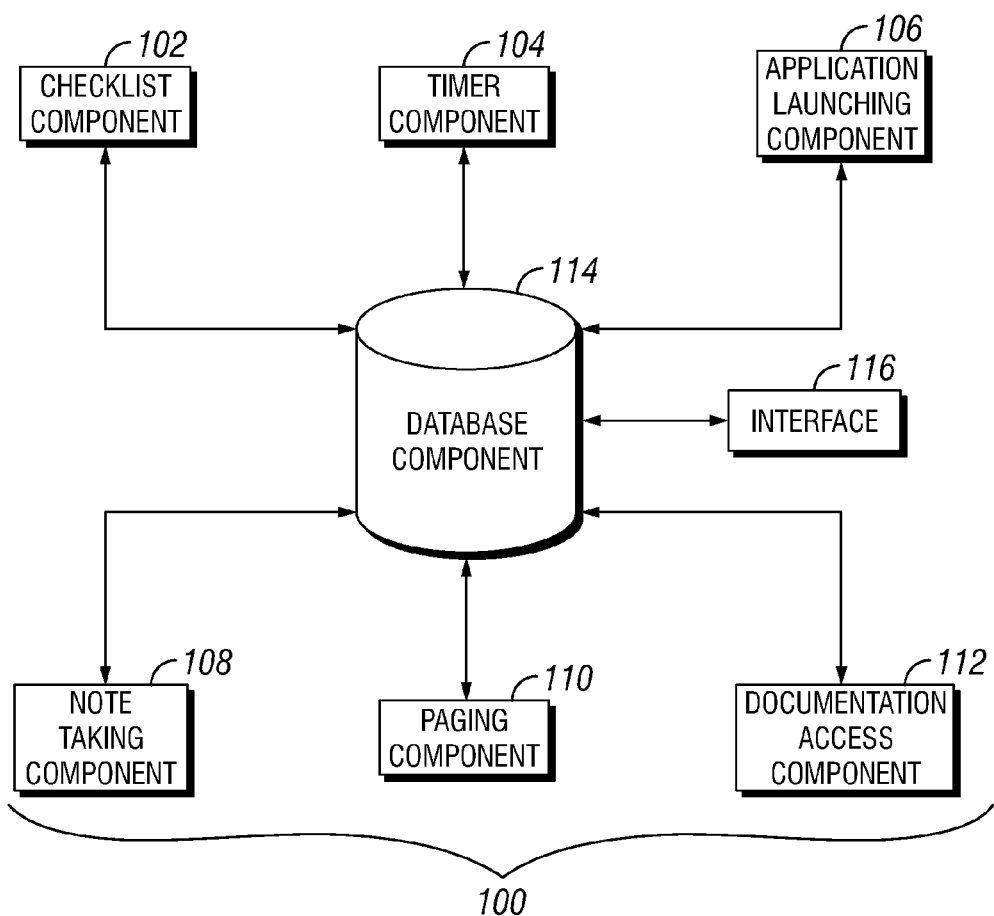
FIG. 1 is a block diagram of one embodiment of a bridge manager tool according to one embodiment of the present disclosure.

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

The present disclosure provides an integrated tool for efficient management and documentation of the resolution of problems as well as simplification of the bridge. In one embodiment, a tool is provided that integrates activities leading up to, during, and after a bridge, and that documents the problem resolution process.

The present disclosure describes a bridge manager tool that consolidates and provides access, in a single view, to all the tools used during a bridge including knowledge links. In an embodiment, the bridge manager tool may be a computer program running on a computer. In an embodiment, the bridge manager tool may be a script or web application running over a network such as the Internet or a Local Area Network ("LAN"). A tool that thus integrates numerous functions by providing organization, time keeping of important events, and access to documentation and separate tools that were previously inefficiently used.

In the related art, an incident manager and the parties involved in resolving a problem use a number of separate tools while carrying on activities aimed at resolving the problem. Such separate applications might include a paging tool to make contact with various individuals or groups needed to resolve the problem, a note taking tool such as Notepad™ or Microsoft Word™, documentation scripts that outline the steps to be taken, templates for creating tickets (such as help desk or Service Desk type tickets), a logging tool to record the activities taken during the incident, a workload management tool, a severity calculator, and other tools.

The Bridge Manager Tool Generally

The general operation and process of problem management may start with receiving a report of a problem. A tool, such as the bridge manager tool, may be used for centralized coordination of problem solving or resolving activities. A manager or leader may coordinate one or more pre-resolution activities may be initiated to resolve the problem. The bridge manager tool may provide for centralized coordination, via a telephone or other communication bridge, of one or more of these resolution activities. One or more individuals that may be necessary or helpful to the process may be paged. The paging might be manually or automatically initiated through the bridge manager tool. A problem resolution checklist that is related to the problem may be provided and performed. The steps or checklist procedures may be documented as they are performed. Any items not performed may be flagged or otherwise identified within a predetermined period of time. The process of problem management may also include launching one or more applications external to the bridge manager tool for problem resolution. Throughout the process, resolution activities are documented to provide historical information to improve the process and assist with future, related problems.

Referring to FIG. 1, a bridge manager tool 100 consolidates all formerly separate problem solving tools into one integrated application. The bridge manager tool 100 provides organization, time keeping of important events, and access to knowledge and tools in a centralized manner. Furthermore, the bridge manager tool 100 interacts with existing Service Desk or help desk functions, including downloading workgroup and contact information. The bridge manager tool 100 collects bridge activity for documentation and backend reporting.

In an embodiment, the bridge manager tool 100 comprises a checklist component 102, a timer component 104, an application launching component 106, a note taking component 108, a paging component 110, a documentation access component 112, a database component 114 and an interface 116, all operably coupled together, each to be discussed in detail below. A feature of the bridge manager tool 100 is that it incorporates existing scripts, already prepared for problem resolution activities. A further feature of the bridge manager tool 100 is that the interface 116 provides a supervisor view such that an incident manager, or higher executives, may access problem resolution data in real time, or near real-time, for each bridge from a single window.

Checklist Component

Referring to FIG. 1, in an embodiment, the bridge manager tool 100 may comprise the checklist component 102. The bridge manager tool 100 incorporates tasks historically determined to be relevant in handling similar problems, and presents them in an organized manner in the checklist component 102. The checklist component 102 enables the incident manager to view, organize, and carry out tasks toward resolution of the problem at hand. Such tasks may, in various embodiments, include pre-bridge activities, activities during the bridge, and activities after conclusion of the bridge.

A portion of the bridge manager tool 100 provides the functionality for managing pre-bridge activities. The checklist component 102 may designate several of the pre-bridge activities. Pre-bridge activities may include adding tickets, actually opening the bridge, notifying various parties regarding the incident which is the subject of the bridge, setting up reminders for notification after the bridge begins, and the like. Some checklist tasks, i.e. pre-bridge activities, are present regardless of the application, while other checklist tasks may be specific to a particular application and will thus only appear in the bridge manager tool 100 for that application. Other examples of post-bridge activities include reporting which may be used to send bridge manager data to other systems, such as IMsite database, for after action review activities and reporting. The wrap-up data may be formatted and sent to the documentation notes so that it can be forwarded to the Service Desk ticket.

A portion of the bridge manager tool 100 provides functionality for managing activities during the bridge. The checklist component 102 may designate several of the bridge activities. Bridge activities may include note-taking on problem resolution activities, initializing or adding to help desk tickets, reporting information for documentation purposes, providing special instructions or reminders, keeping timers for various deadlines, and the like. Some checklist tasks, i.e. bridge activities, are present regardless of the application, while other checklist tasks may be specific to a particular application and will thus only appear in the bridge manager tool 100 for that application. For example, people responsible for other systems that are reliant or dependent on the system having problems may need to be notified. The relationship and the related systems are unique to the system having problems. More critical systems my have one set of processes and checklists that are more comprehensive and responsive, while less critical system may have other checklists.

A portion of the bridge manager tool 100 provides functionality for managing post-bridge activities after conclusion the bridge. The checklist component 102 may designate several of the post-bridge activities. Post-bridge activities may include developing documentation of tasks completed or omitted during the bridge, organizing statistical data resulting from the bridge, generating reports, and the like. Some checklist tasks, i.e. post-bridge activities, are present regardless of the application, while other checklist tasks may be specific to a particular application and will thus only appear in the bridge manager tool 100 for that application.

Figure 2:
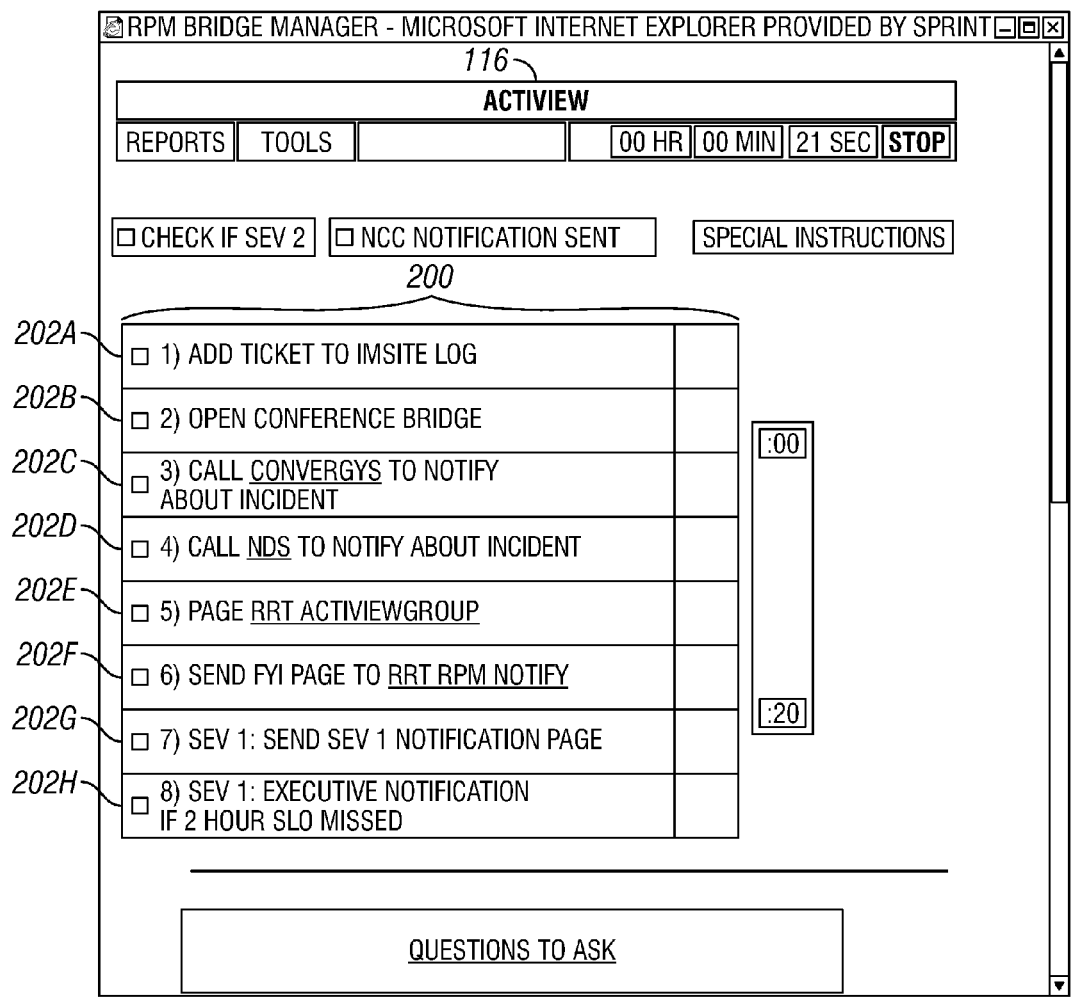
FIG. 2 shows an exemplary view of a checklist component of the bridge manager tool in accordance with one or more embodiments.

An exemplary embodiment of the interface 116 of the bridge manager tool 100 is shown in FIG. 2. The checklist component 200 is displayed in the interface 116. The checklist component 200 comprises one or more tasks 202A, 202B, 202C, and so on. In an embodiment, the problem addressed with the bridge manager tool 100 may determine the number and topic of tasks 202 listed in the checklist component 200. Some tasks 202 are present in the checklist component 200 for all applications, while others are unique to an application and only appear in the bridge manager tool 100 for that application. For example, a first application error may require actions X, Y and Z, while a second application error may require follow-up on A, B and C with parties S and T. Some tasks 202 are automated tasks performed by the incident manager through the bridge manager tool 100, while other tasks may be manually performed by the incident manager.

Timer Component

Figure 3A:
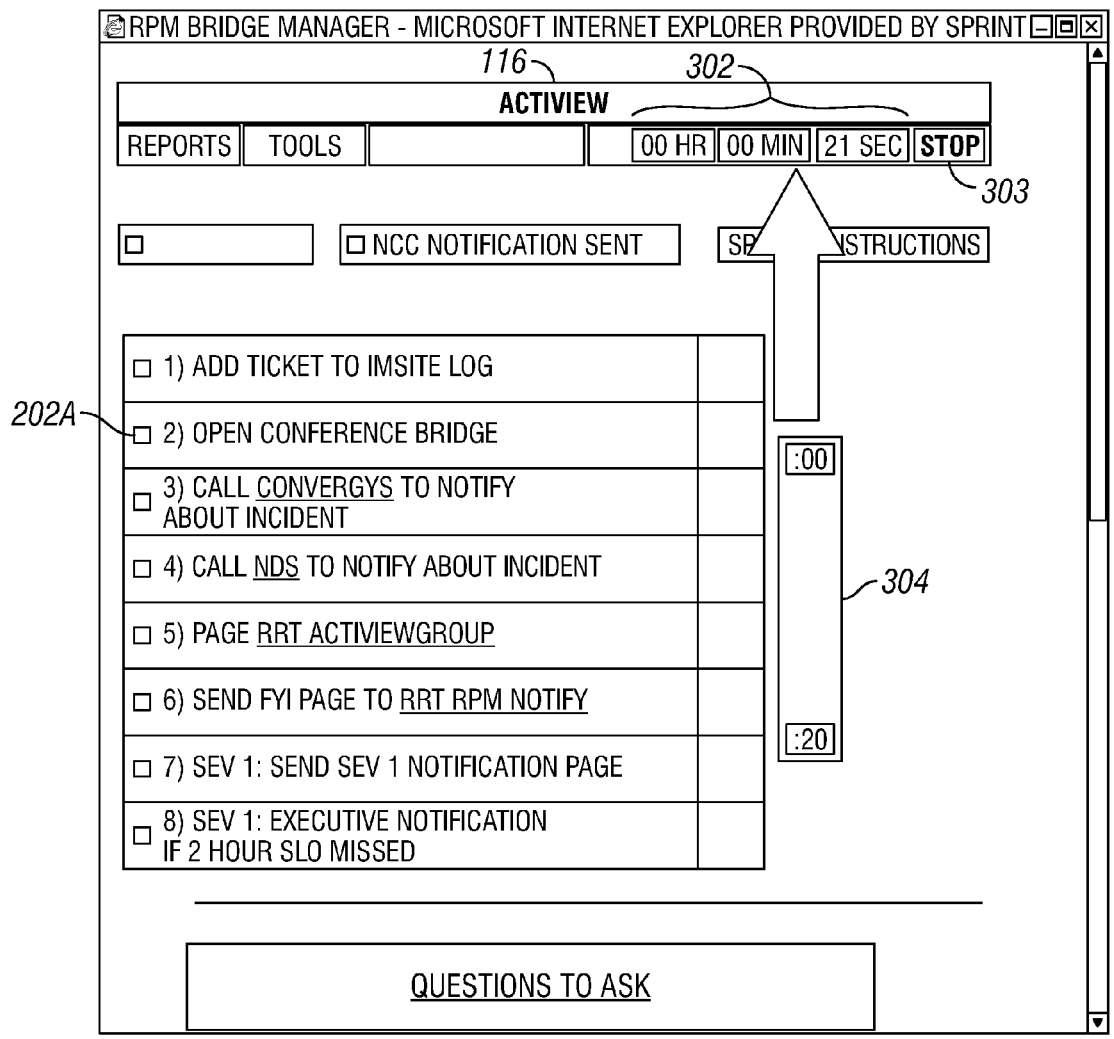
FIG. 3A shows an exemplary view of a timer component of the bridge manager tool in accordance with one or more embodiments.
Figure 3B:
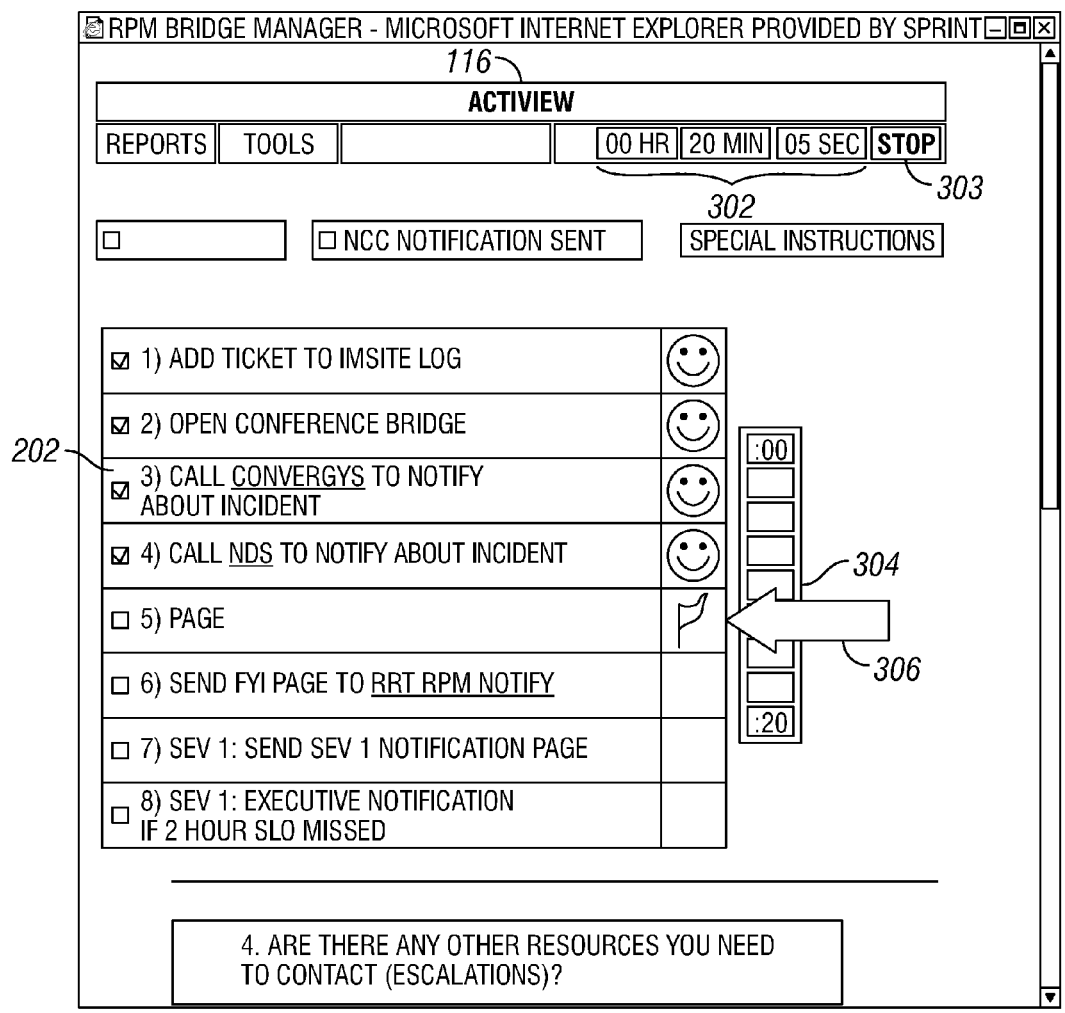
FIG. 3B shows an alternative exemplary view of a timer component of the bridge manager tool in accordance with one or more embodiments.

The bridge manager tool 100 may also feature the timer component 104 comprising one or more timers, as shown in exemplary form in FIGS. 3A and 3B. The timer component 104 may start when the bridge manager tool 100 is started, or when the application is launched. In an embodiment, an incident clock 302 comprises the clock based on the timer that shows the duration of the incident, visible in the interface 116 of the bridge manager tool 100. A "stop" button 303 may be used to stop the incident clock 302 and any or all other timers. The total outage time and total bridge time (if the two numbers vary) are automatically calculated. A note may be automatically added to the documentation and the information is then sent to the database for reporting. The total bridge time can differ from total outage time if a bridge is reconvened. The total bridge time is calculated by deducting the time interval between reconvened bridges from the total outage time. Both times are tracked and reported. The time stamps may be prefixed to all related documentation entries automatically, regardless of whether the note was typed in manually by the Incident Manager or auto-populated by a Bridge Manager activity. In an embodiment, a 20 minute graphical timer 304 is an additional timer that may be visible in the bridge manager tool 100. In an embodiment, additional timers may be visible in the bridge manager tool 100 or may keep time without being displayed in the interface 116 of the bridge manager tool 100.

One or more timers may be used to allow the incident manager to flag any action items that are not performed within a pre-determined, or advised, time limit. For example, a checklist task 202 may call for a certain relevant team to be paged within 20 minutes of a problem being logged. If the checklist task 202 is not completed within 20 minutes, then a red flag 306 may appear in association with the checklist task 202. The timer component 104 enables the incident manager to assess, at a glance, whether deadlines are being met based on whether checklist tasks 202 have red flags 306 associated with them, and thereby whether the problem resolution process is progressing as desired. The bridge manager tool 100 documents the timing of actions taken to resolve the problem, and the documentation may be used later for improving efficiency of the bridge process, training, and the like. It will be appreciated that while the intention may be to solve the problems giving rise to the incidents or issues, it may not always be possible to solve the problems. Thus, the goal may be to resolve the problem, which may include solving or resolving the problem, bypassing or finding some type of work-around, or otherwise dealing with or perhaps accepting the problem.

In the preferred embodiment, a time stamp is automatically inserted into documentation to record the date and time, relative to the start of the incident clock 302, of a given event. One example of an event to be time-stamped is the entry or exit of certain teams or team members on the bridge. Another example of an event to be time-stamped is when various actions occurred or tasks are completed relative to the beginning of the incident or the beginning of the bridge. These events and others may be pertinent to analysis of the bridge flow at some later time, may be used to evaluate team members, and the like.

Documentation and Templates

Figure 4:
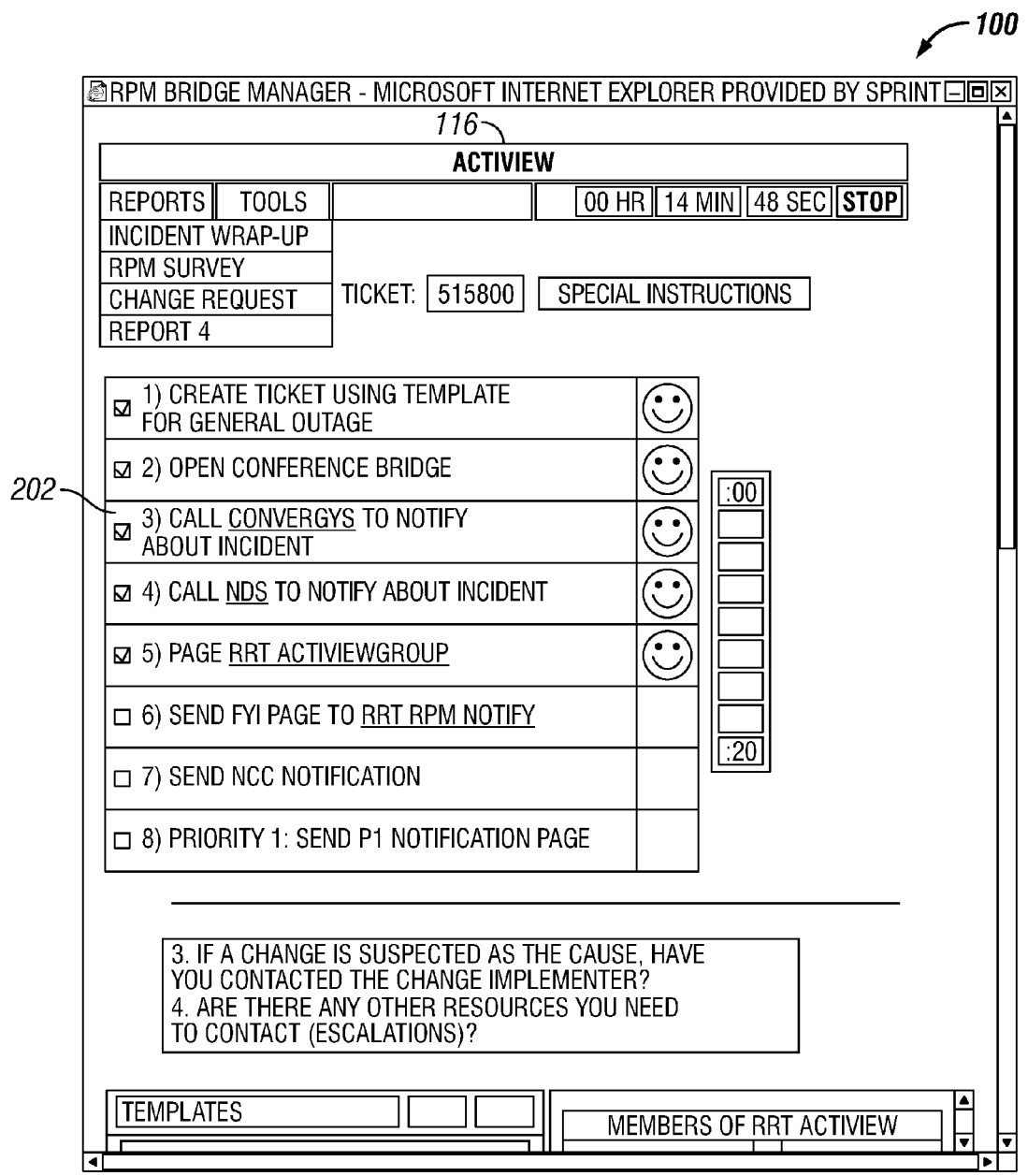
FIG. 4 shows an exemplary view of a documentation access component of the bridge manager tool in accordance with one or more embodiments.

Another feature of the bridge manager tool 100 is that the incident manager may access reporting forms, ticket templates, etc. all from the bridge manager tool 100 through the application launching component 106. The use of templates saves time during information gathering and ticket creation. The various reporting forms, ticket templates and other documentation that may be generated over the course of a bridge may be available in the bridge manager tool 100 in drop-down menus, buttons, or links accessible by the incident manager in the application launching component 106. The various forms or templates may be launched from the interface 116 of the bridge manager tool 100. FIG. 4 illustrates another embodiment of the interface 116 of the bridge manager tool 100. As shown in an exemplary embodiment in FIG. 4, the forms or templates may be launched by selecting a form from one or more drop-down menus 400. Reporting incidents may be pertinent as part of the pre-bridge activities, during the bridge, and additionally, after conclusion of the bridge. Information entered through the bridge manager tool's 100 access to documentation and templates may be stored in the database component 114. Documentation generated in this manner may be used for future analysis of problem solving processes, techniques and efficiency.

Once information is stored, an incident manager may view complete templates or help desk information from the interface 116 of the bridge manager tool 100. A completed template button or drop-down menu may be selected from the interface 116 to review such completed and stored information.

Linking Other Applications

Figure 5A:
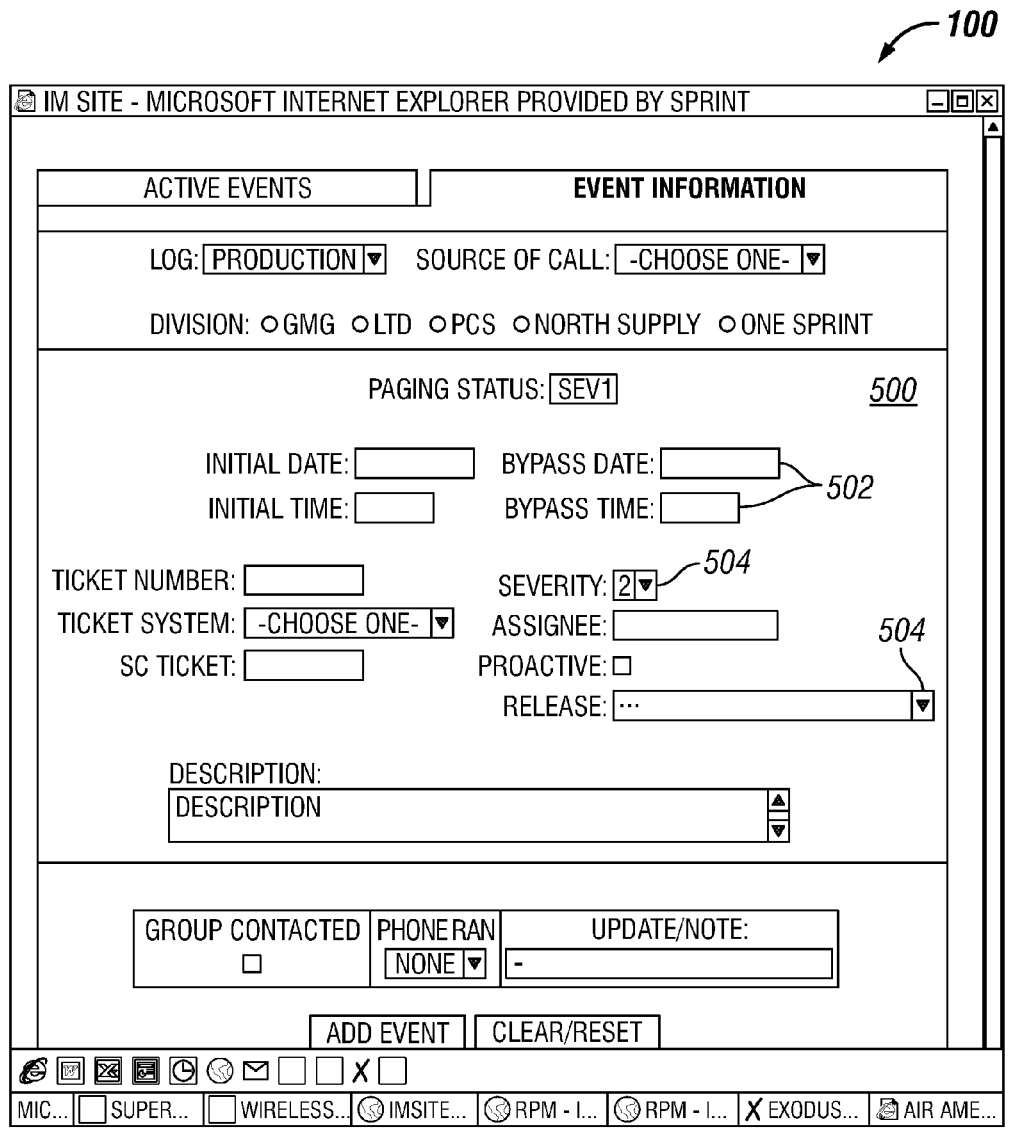
FIG. 5A shows an exemplary view of an application launching component of the bridge manager tool in accordance with one or more embodiments.
Figure 5B:
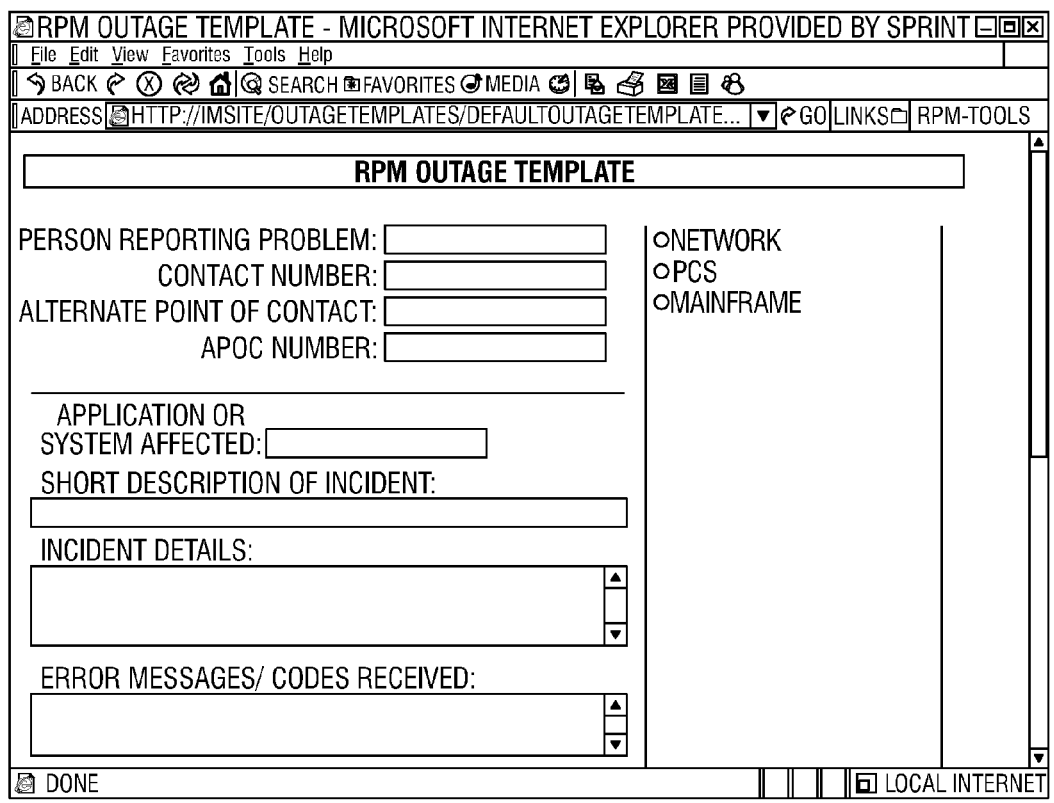
FIG. 5B shows another exemplary view of the application launching component of the bridge manager tool in accordance with one or more embodiments.

The bridge manager tool 100 may link directly into other applications/actions that are unique to the particular problem that is the subject of the bridge. For example, one application that might be linked to from within the bridge manager tool 100 is the Incident Manager website ("IMsite website"). By choosing the checklist task 202 related to the IMsite, the incident manager launches a ticket edit window 500 (as shown in an exemplary embodiment of the bridge manager tool 100 interface 116 in FIG. 5A) from the IMsite website, and may thereby add ticket information to the IMsite ticket log. Ticket information entered through the ticket edit window 500 may include data such as, for example, the source of a call, paging status, date, time, ticket number, severity of the problem, ticket system, assignee, release, a description, and identification regarding the group contacted to handle the problem. In an embodiment, the data entered through the ticket edit window 500 may be entered into entry fields 502 or chosen from drop-down menus 504, based on the type of data to be entered. In another example, an application that may be linked for access from within the bridge manager tool 100 is Nortel Softphone™ (a program that converts a personal computer into a platform for voice, data, and video communications using a single Internet connection for both voice and data connection). In an embodiment, by choosing the checklist tasks (202) related to Nortel Softphone™, the incident manager may open the incident manager's personal conference bridge directly from the bridge manager tool 100 without having to separately load the Softphone™ application. Upon launching the incident manager's personal conference bridge, a note may be added in the note taking component 108 as will be discussed in greater detail below. In other embodiments, the tickets may be created using a Outage Template, such as illustrated in FIG. 5B.

Paging

Figure 6A:
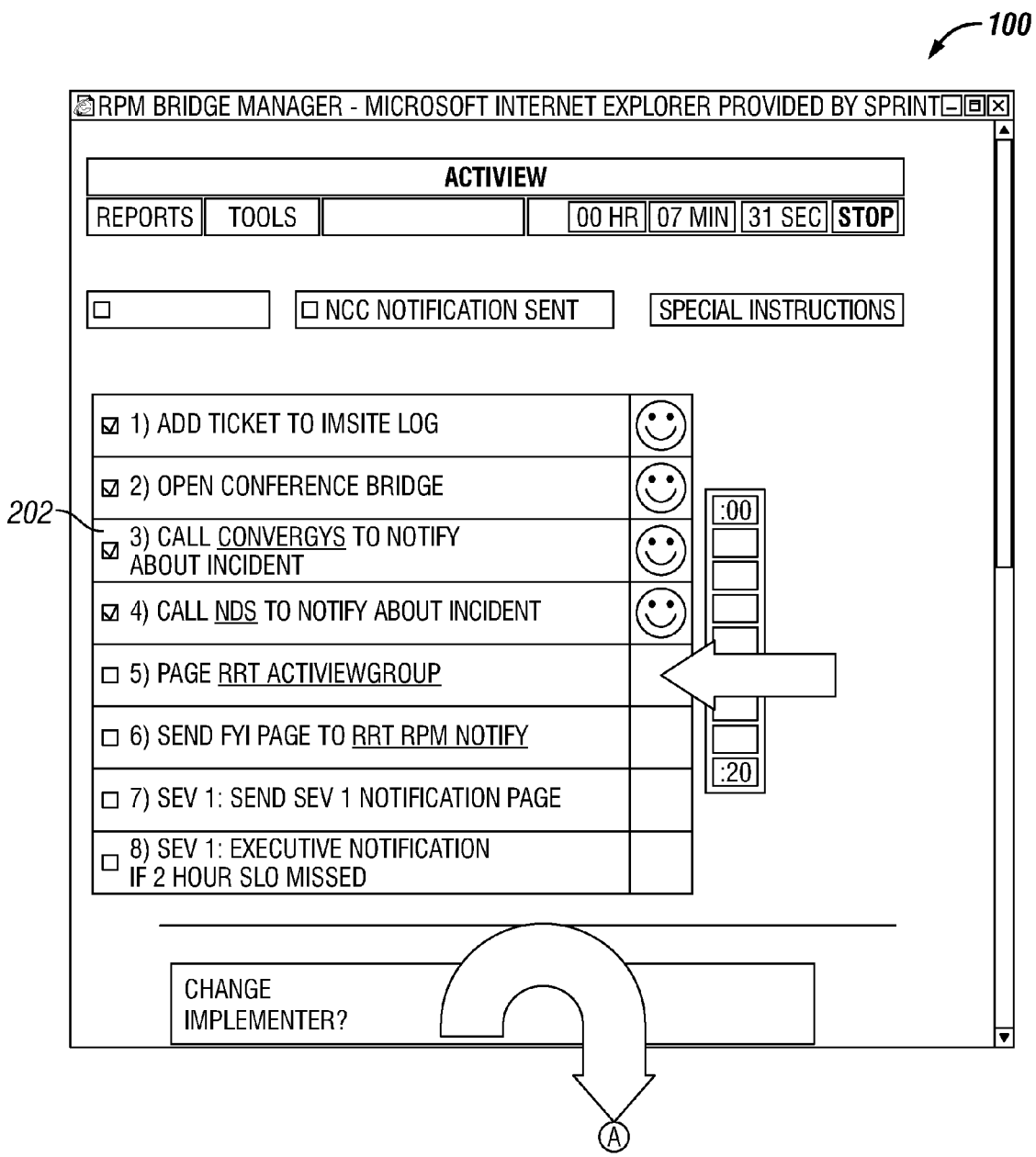
FIGS. 6A and 6B show an exemplary view of a paging component of the bridge manager tool in accordance with one or more embodiments.
Figure 6B:
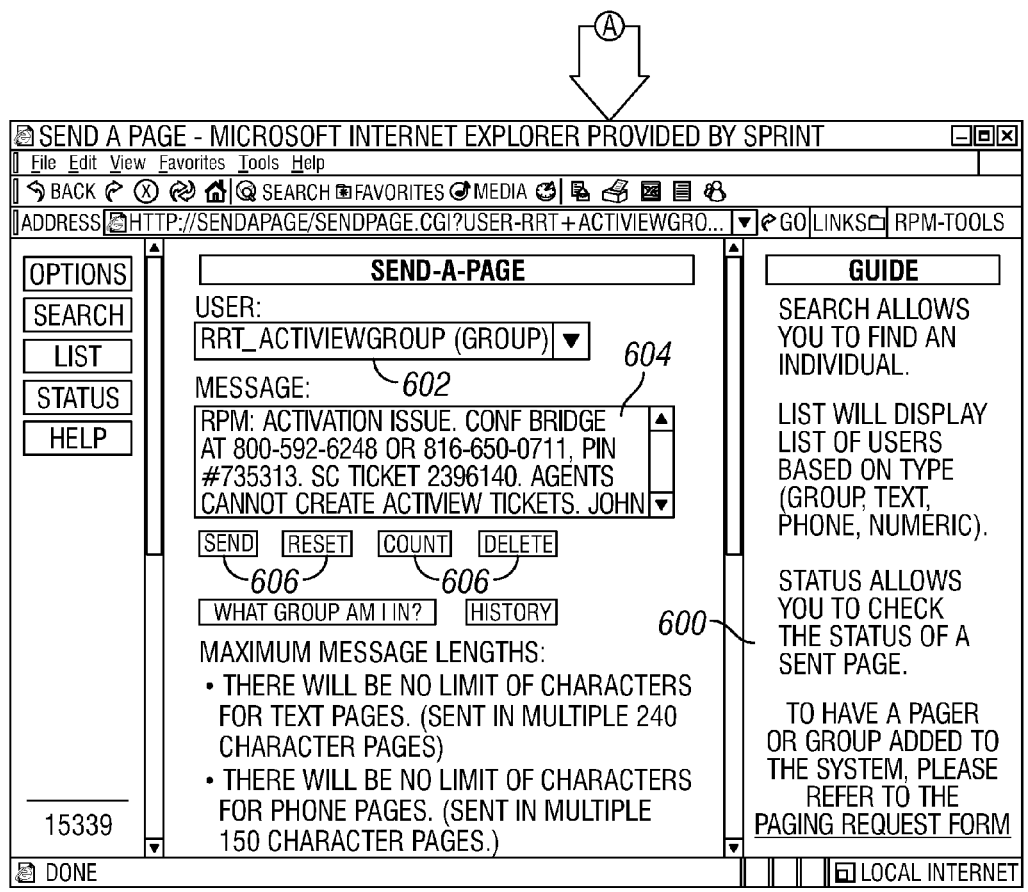

The paging component 110 of the bridge manager tool 100 directly launches the paging tool for paging all teams and individuals relevant to solving the problem at hand. The paging component 110 may be pre-populated with data such as, for example, the paging information and specific paging group. In an embodiment, using the paging component 110, the incident manager may select a checklist task 202 that links to the paging component 110. Selecting the paging component 110 launches a paging tool window 600. The paging tool window 600 may comprise, as shown in an exemplary embodiment in FIGS. 6A and 6B, a user field 602, a message field 604, and one or more action buttons 606, which may comprise selections such as "send," "reset," "count," "delay," "history," and the like. The incident manager may select the user field 602 to address a page sent by him, and populate the message field 604 with details pertaining to the problem subject of the bridge, and click the "send" action button 606 to send a page containing the contents of the message field 604 to groups and individuals involved in resolving the problem.

Note-Taking Documentation

Figure 7A:
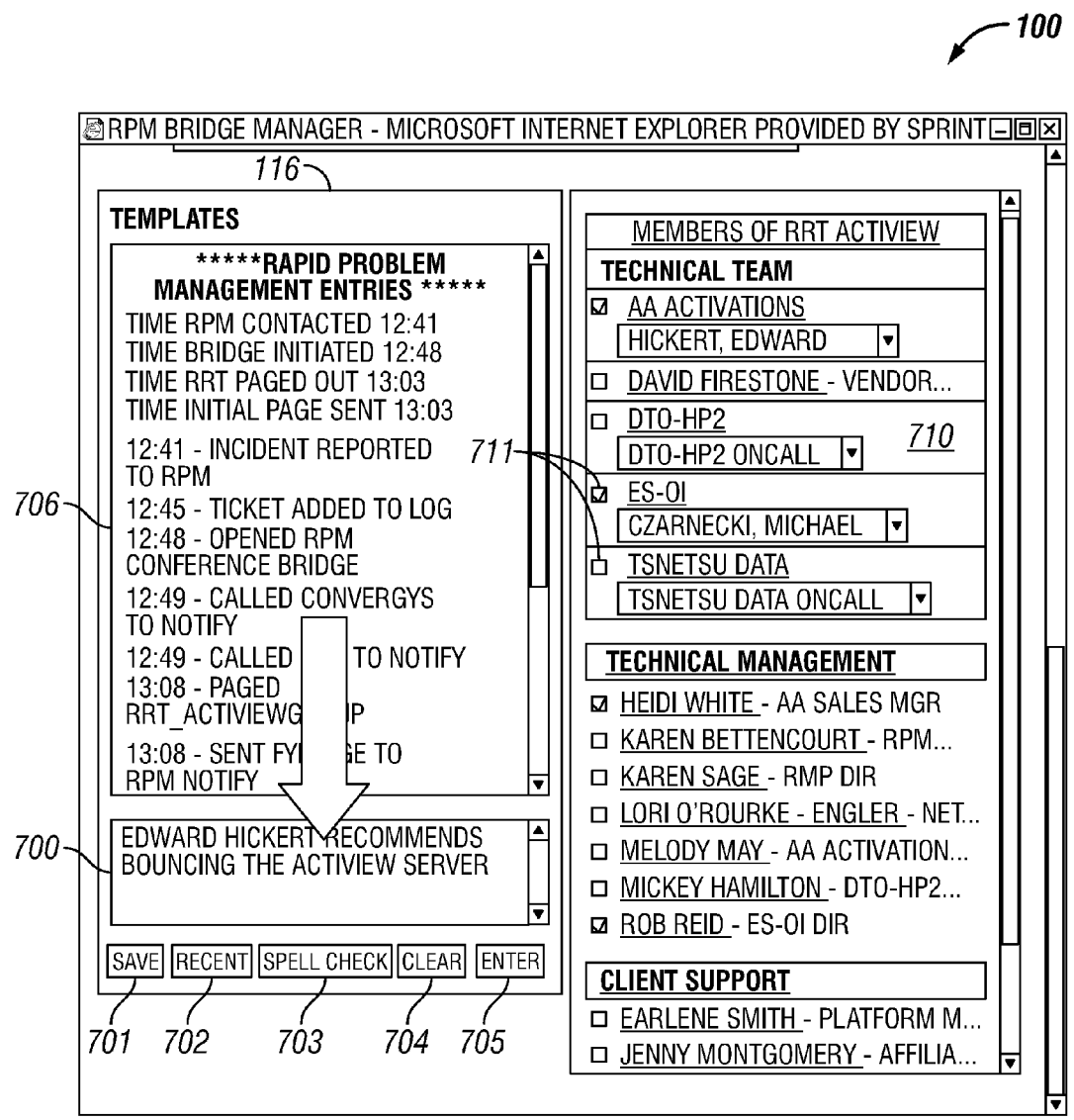
FIG. 7A shows an exemplary view of a note-taking component of the bridge manager tool in accordance with one or more embodiments.

In the bridge manager tool 100, the note taking component 108 provides automated note-taking capability. Referring to FIG. 7A, the note taking component 108 incorporates the ability to make notes commenting on various actions during the bridge. Notes may be saved from the main window 706. The Save button 701 saves all notes in window 706 and the Recent button 702 saves only the incremented notes entered into window 706 (via entry field 700) since the last time the Save button 701 or Recent button 702 was clicked. The documentation notes are first saved to the database for the Supervisor View and reporting and then forwarded on to the appropriate Service Desk ticket. In an embodiment, a "spell-check" button 703 may be selected to check the spelling of an entry in the entry field 706 before saving it. In an embodiment, a "clear" button 704 may be selected to erase any entry in the entry field 700 that has not yet been saved. The main window 706 of the note taking component displays the entries, timestamps, and actions taken and documented up to the current point in time. In an embodiment, pressing the above-described function buttons 701-704 may send the corresponding note entered in the entry field 700 directly to the Services Desk ticket.

Additionally, the note taking component 108 may add time-stamped notes to the main window 706. In an embodiment, an "enter" button 705 may be selected to add a time-stamp to the main window 706. Time-stamped notes allow later analysis of the timeline of events during the bridge and problem solving. Notes taken during the bridge may transfer directly into the help desk ticket, to further facilitate the problem solving process. In the note taking component 108, formatting may be implemented so that incident managers can change font type, size, bold, etc. for easy identification of key events that occur during a bridge.

Figure 7B:
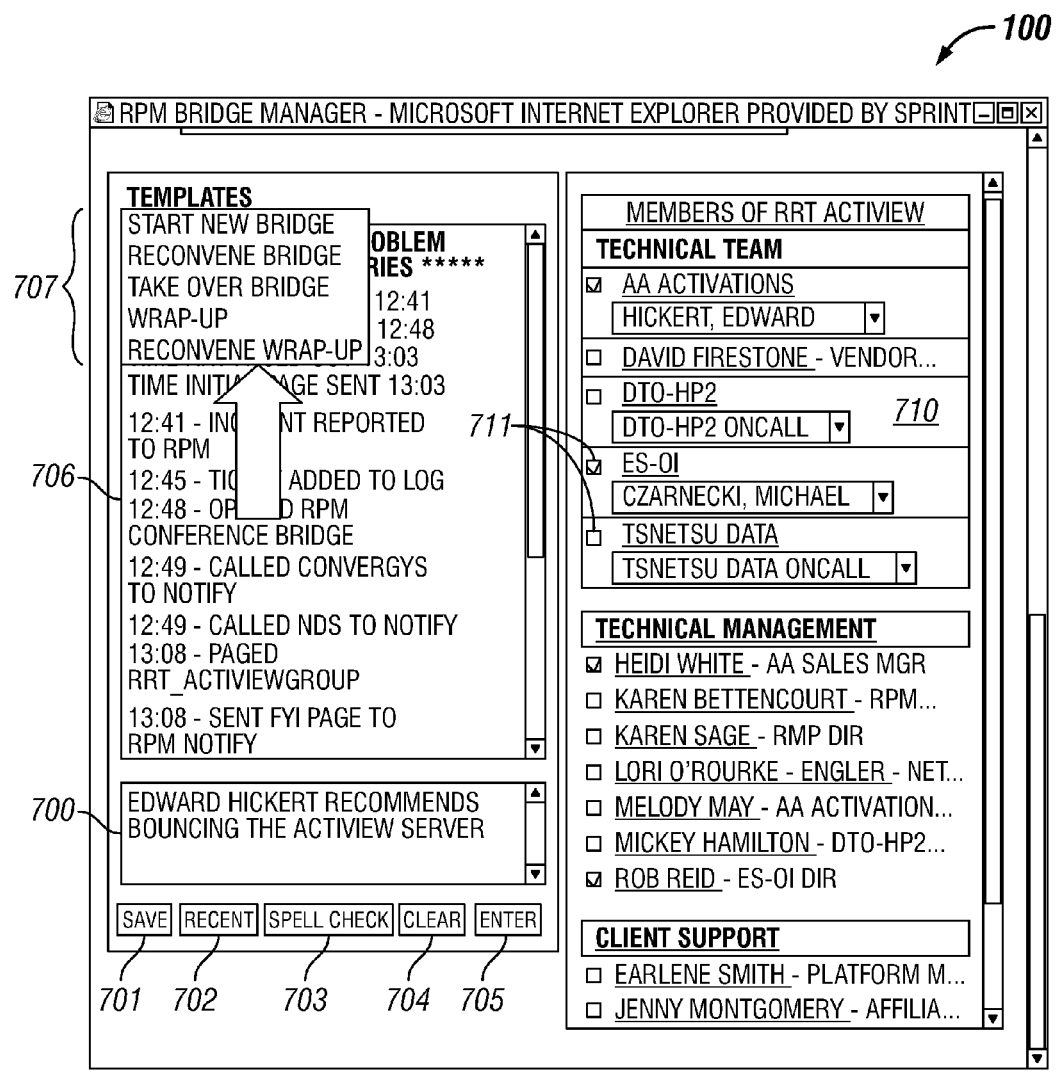
FIG. 7B shows an exemplary view of a note-taking component using templates of the bridge manager tool in accordance with one or more embodiments.

Templates used in note taking may also be accessed from one or more drop-down menus 707 (as seen in FIG. 7B) in the interface 116 in the note taking component 108. In an embodiment, templates may include a standardized entry that is entered in the entry field 700 for activities such as "start new bridge," "reconvene bridge," "take over bridge," "wrap-up," and "reconvene wrap-up." The template selected from the drop-down menu 707 is added to the main window 706 upon selection. FIG. 7B also illustrates monitoring bridge participants. For example, if within a predetermined period of time a selected team member has not joined the bridge, an alert may appear, such as a change to the color or by displaying of an icon or flag, to notify the Incident Manager that the individual has not yet joined the bridge. Further, by typing in a text string and selecting a "Find" button, the entry field 700 may be searched for any text string, such the name of a participant to determine whether a member has joined the bridge. Also, icons may appear in the note taking tool when checklist items have a red flag or when a timer to remind the Incident Manager to save the notes expires, such as every 20 minutes.

In an embodiment, an icon may appear to remind the incident manager to save the notes entered up until the current point in time if the notes have not been saved in the last 20 minutes. In an embodiment, notes may be saved on a periodic basis automatically.

Workgroups

Individuals relevant to resolving a problem may comprise one or more workgroups. The team member individuals of various workgroups may be listed in a table 710 in the interface 116. In an embodiment, members may be viewed by the incident manager via a drop-down list, populated with data provided by other systems. A checkbox 711 may be associated with each team member individual's name which, when selected, adds a time-stamped note to the main window 706. If, within a pre-determined period of time, the selected team member individual has not joined the bridge, an alert may appear, such as a color change or display of an icon or flag to notify the incident manager that the individual has not yet joined the bridge.

Figure 7C:
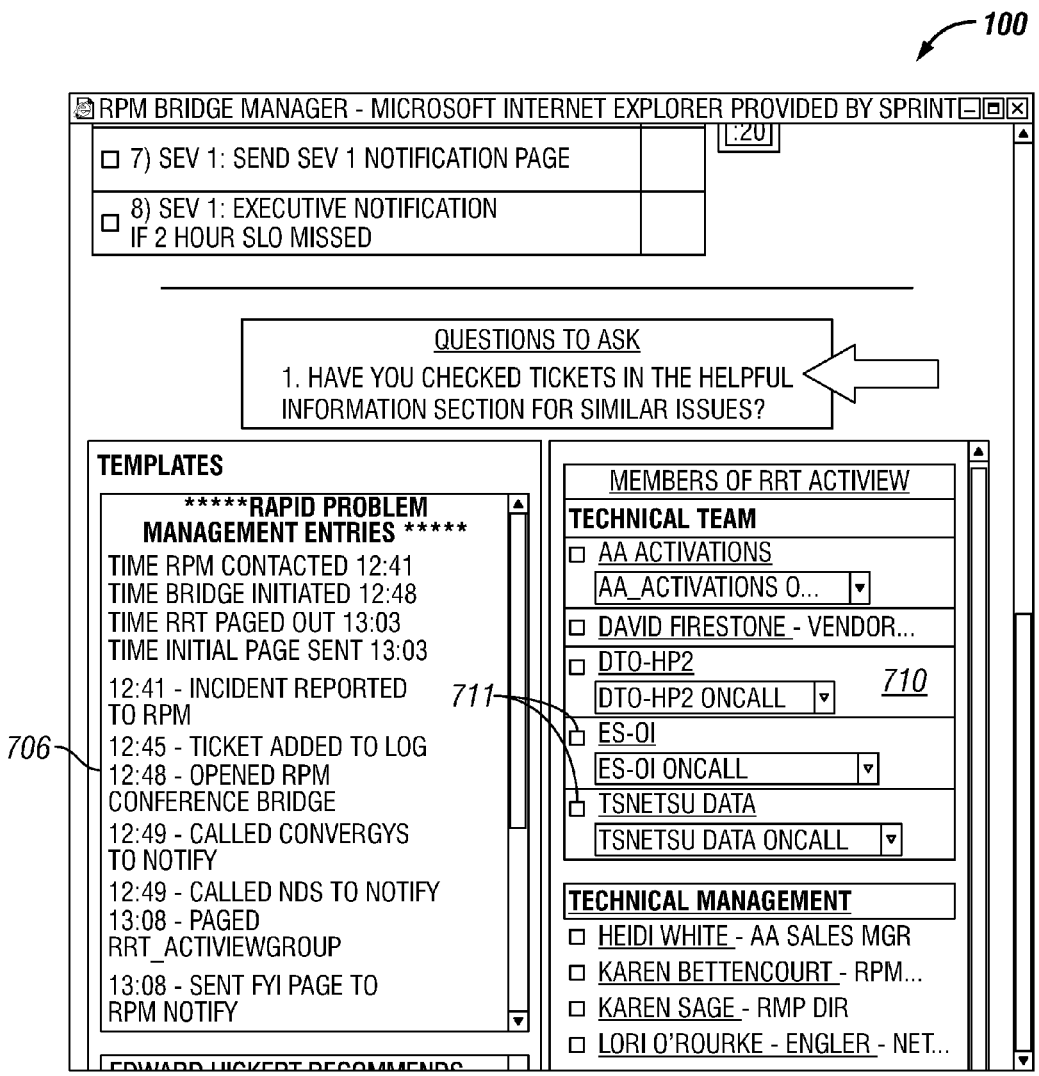
FIG. 7C shows an exemplary view of a note-taking component with scrolling reminders of the bridge manager tool in accordance with one or more embodiments.
Figure 7D:
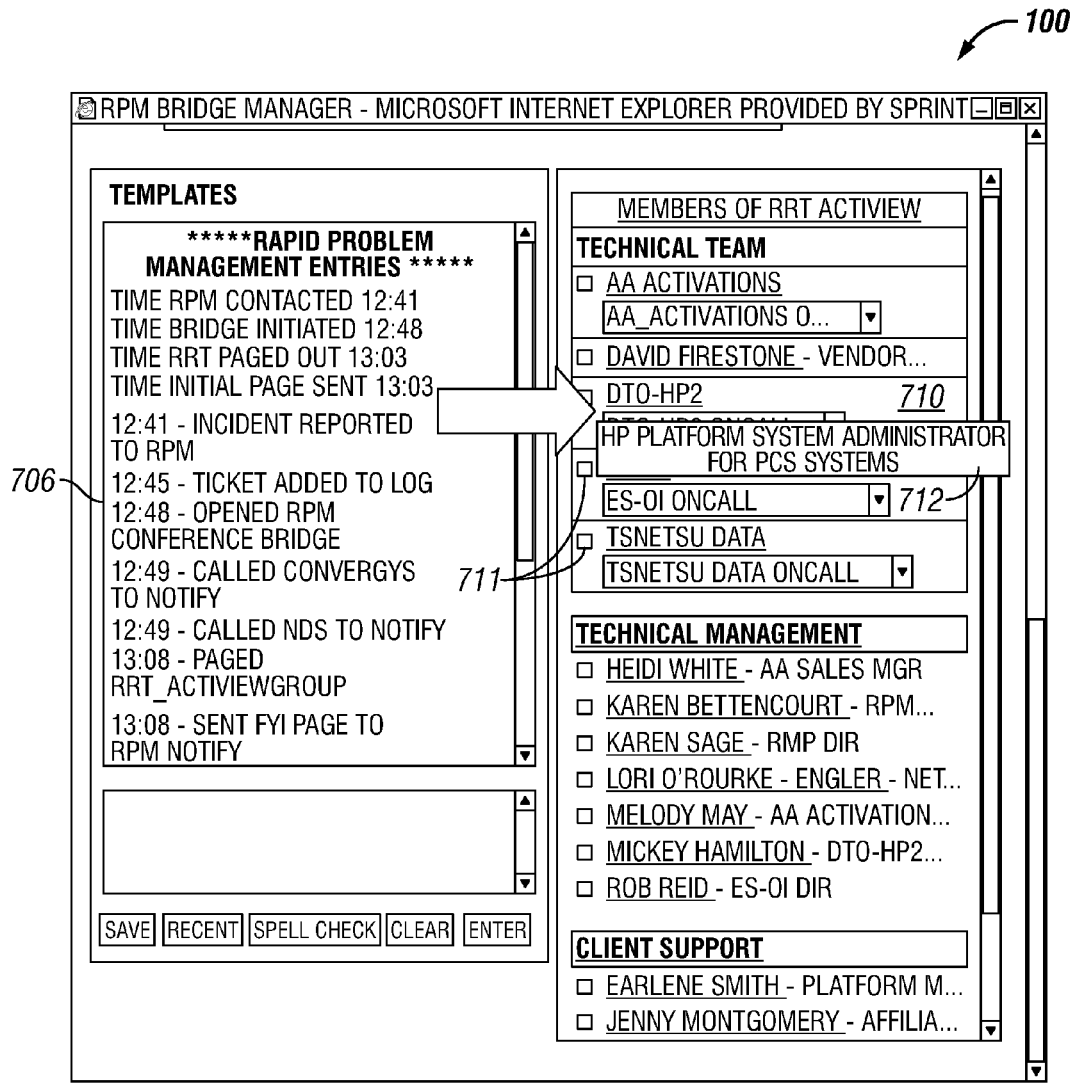
FIG. 7D shows an exemplary view of a note-taking component with workgroup table using tool tips of the bridge manager tool in accordance with one or more embodiments.
Figure 7E:
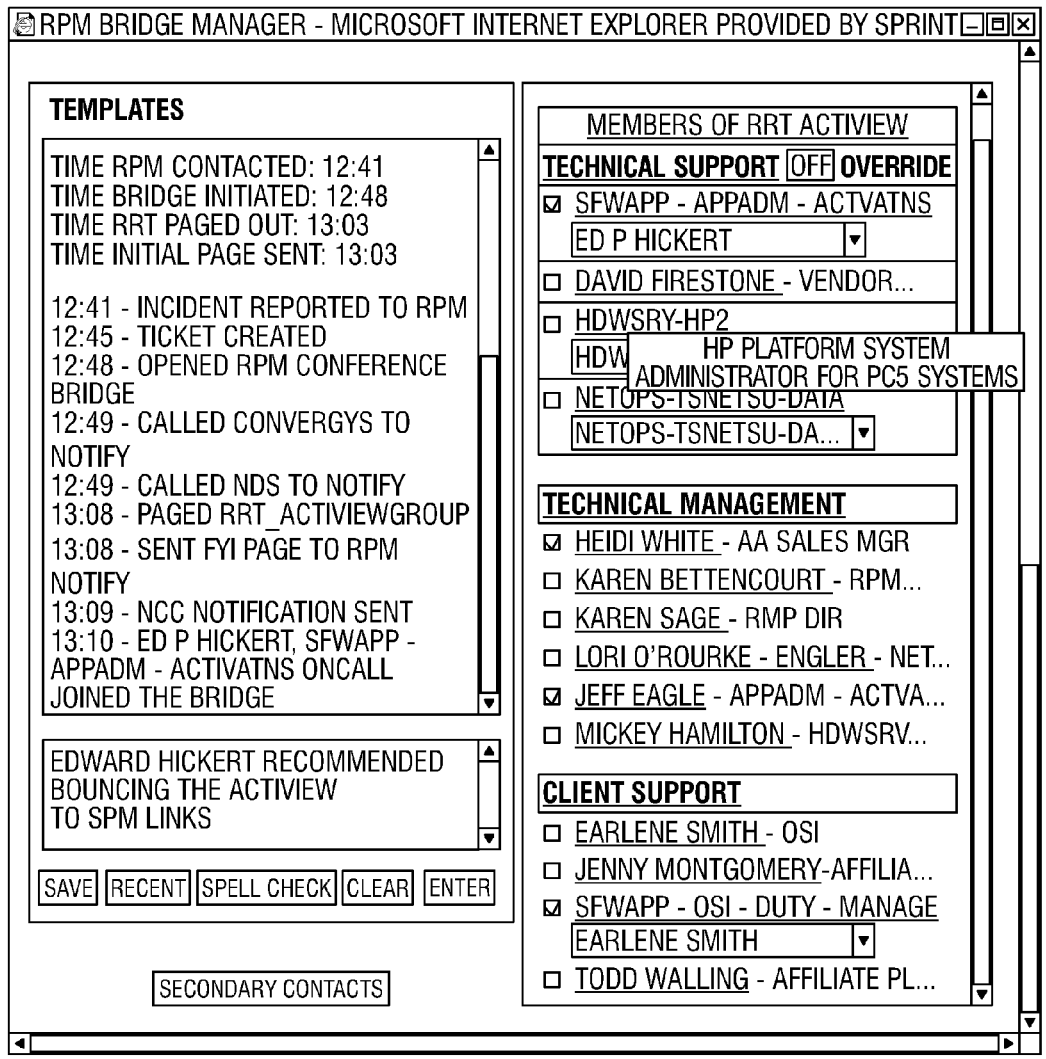
FIG. 7E shows another embodiment of the bridge manager tool in accordance with one or more embodiments.

In an embodiment, when viewing the workgroups table 710, a tool tip 712 may be displayed (as shown in FIG. 7D). A tool tip 712 for a workgroup table 710 displays what the group supports and a tool tip 712 for an individual displays the individual's contact information. Selecting the displayed tool tip 712 for a person or group may launch a separate window comprising knowledge database entry to provide greater detail. Tool tips 712 may, in an embodiment, be activated by a hovering the mouse over the text of a workgroup or individual's name. FIG. 7E illustrates another embodiment of the bridge manager tool and the interface for taking notes.

Figure 7F:
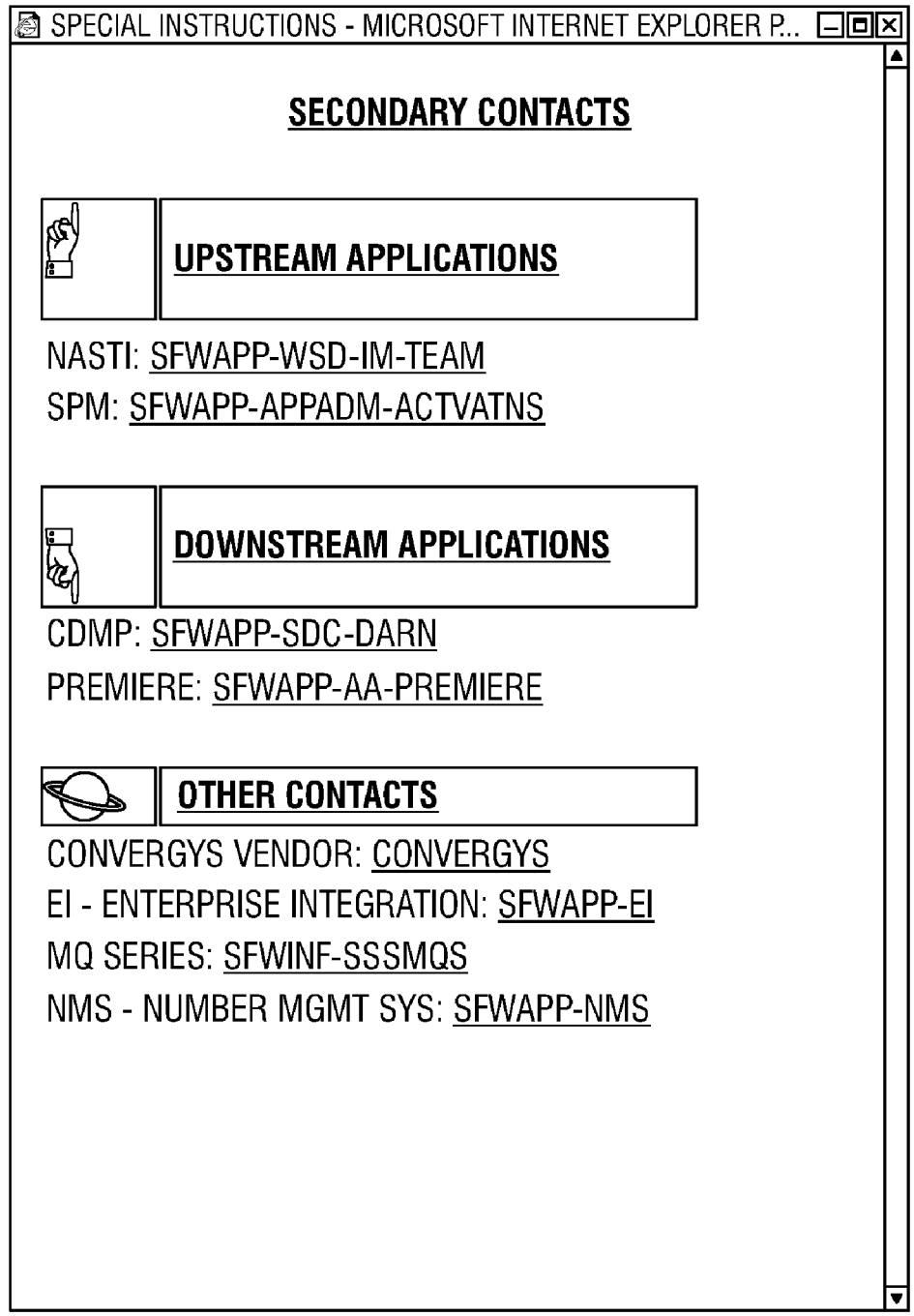
FIG. 7F is an exemplary window for selection of secondary contacts of the bridge manager tool in accordance with one or more embodiments.

FIG. 7F illustrates a window including a secondary contacts link (in the form of a button or drop-down menu) which may, in an embodiment, also appear in the interface 116 when an application involves support groups specific to some, but not all, calls. Selecting the secondary contacts link may launch a new window with links to a contacts knowledge database, linking the incident manager to other individuals with expertise pertinent to resolving the problem.

Reminders & Special Instructions

The bridge manager tool 100 may incorporate one or more reminder messages 708 (as shown in the exemplary embodiment of FIG. 7C) in the interface 116 to inform the incident manager of items of interest, or items that need to be monitored. In various embodiments, the reminder messages 708 may scroll continuously while being updated according to what is occurring in the bridge, or the reminder messages 708 may appear in the bridge manager tool 100 at certain points in the bridge. Reminder messages 708 may be standardized and applicable to every call, or may be specific to certain applications. The reminder messages 708 may be periodically updated over the course of the bridge.

Figure 8A:
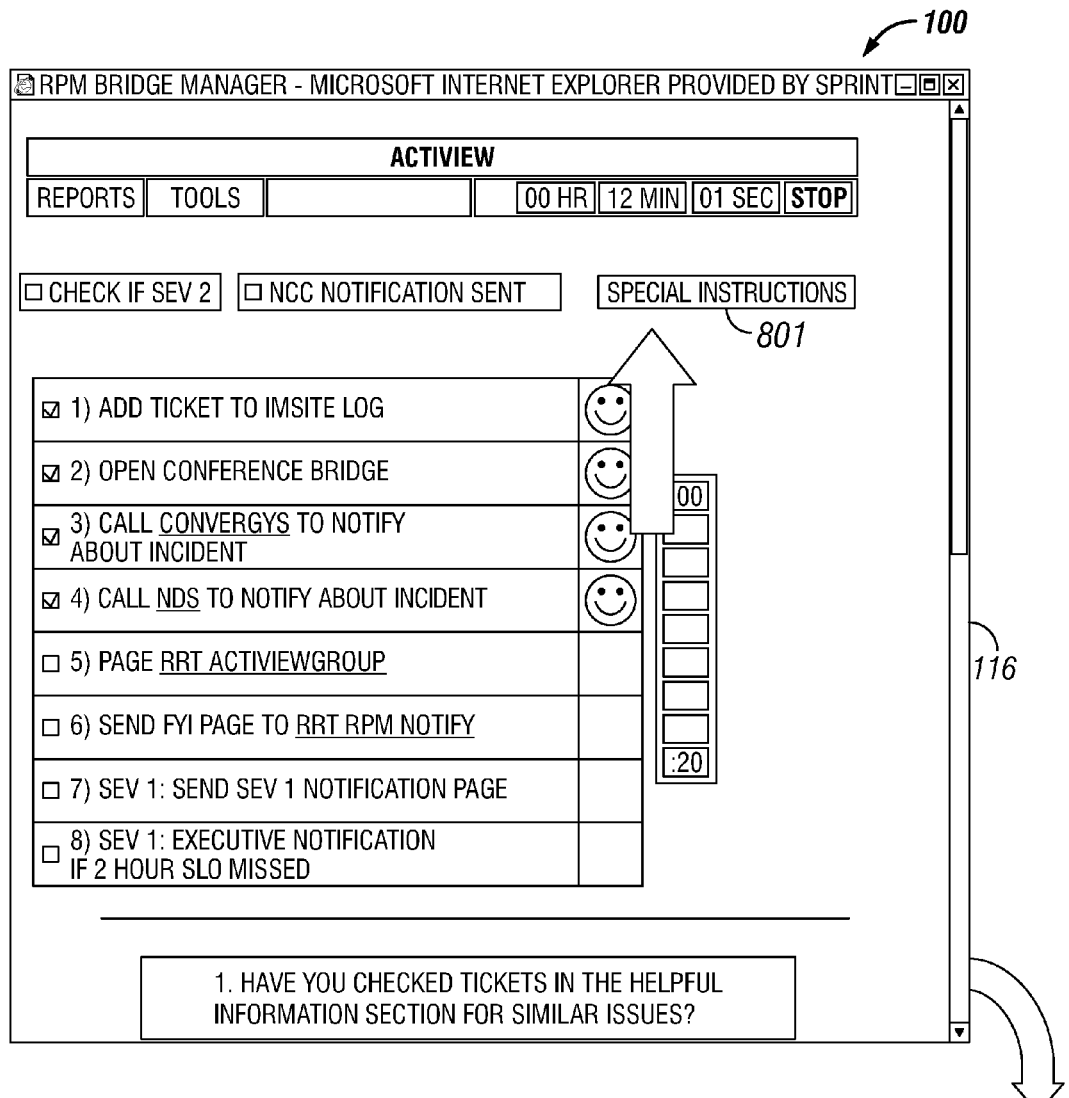
FIGS. 8A and 8B show an exemplary view of the interface of the bridge manager tool with special instructions in accordance with one or more embodiments.
Figure 8B:
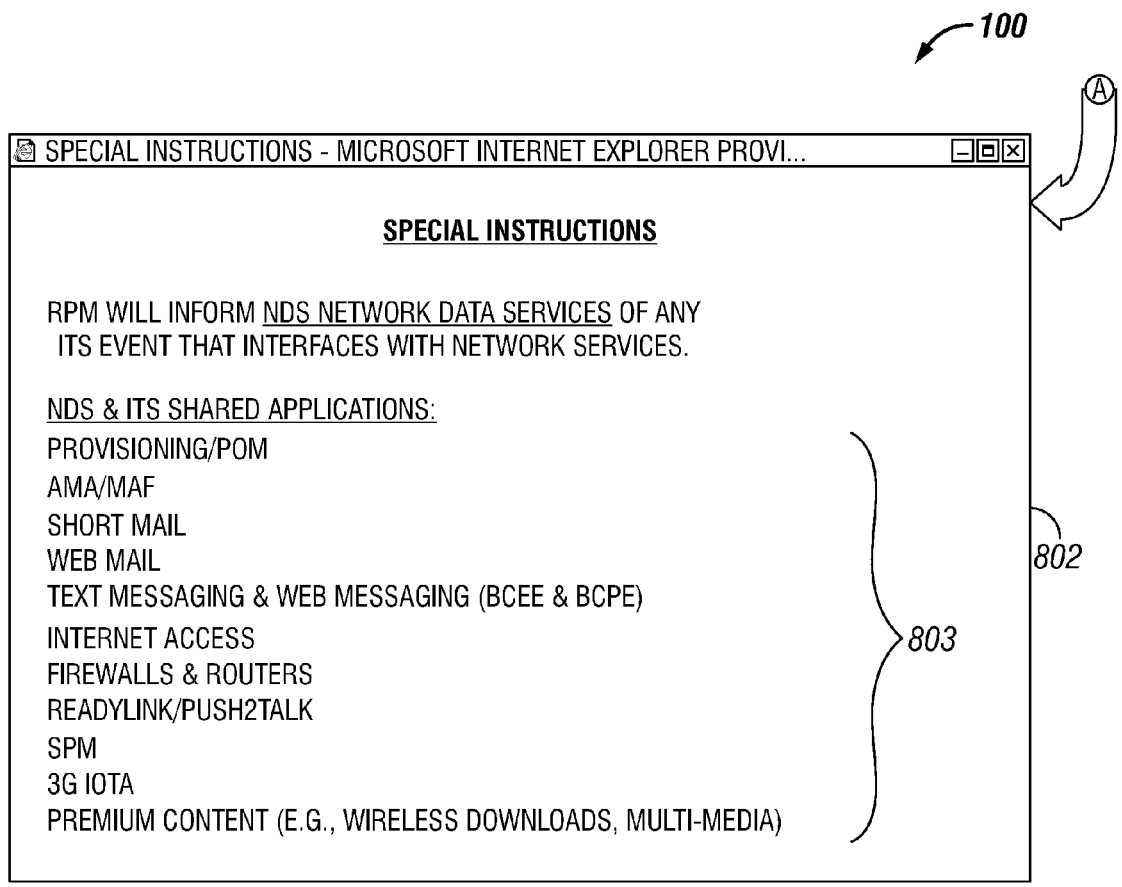

In an embodiment, the bridge manager tool 100 may additionally incorporate one or more special instructions, displayed as an option when a special condition exists as part of the problem, dictating a course of action that is outside the standard process flow, or steps usually taken in resolving similar problems in the past. A special instructions link 801 may appear in the interface 116 (as shown in the exemplary embodiment of FIGS. 8A and 8B). The special instructions link 801 may, in various embodiments, take the form of a button or a drop-down menu. Selecting the special instructions link 801 may launch a separate special instructions window 802 with additional instructions and information 803 for the incident manager.

Bridge Transition

In an embodiment, a bridge transition saves the state of the bridge manager tool 100 to allow transfer of management from one incident manager to another. A bridge transition may occur, for instance, when a bridge in progress is turned over to a different incident manager or when a bridge is scheduled to reconvene at a later time. The bridge transition creates a saved state that includes all notes taken with the note taking component 108, all timers of the timer component 104 (including the incident clock 302), any checklist tasks 202 that have been checked as completed and all reporting data. In an embodiment, all of the saved state information and notes are stored in the database component 114 for later retrieval. A dialog box for bridge transition may be accessed from the bridge manager tool 100. By selecting the dialog box, the incident manager may designate the type of bridge transition and add other information pertinent to the transition. Submitting the transition dialog box may, in an embodiment, add further information to the note taking component 108 of the main window 706. Upon retrieval of the saved state, the bridge manager tool may be repopulated with all of the saved state information and notes stored in the database component 114.

Computer System

Figure 9:
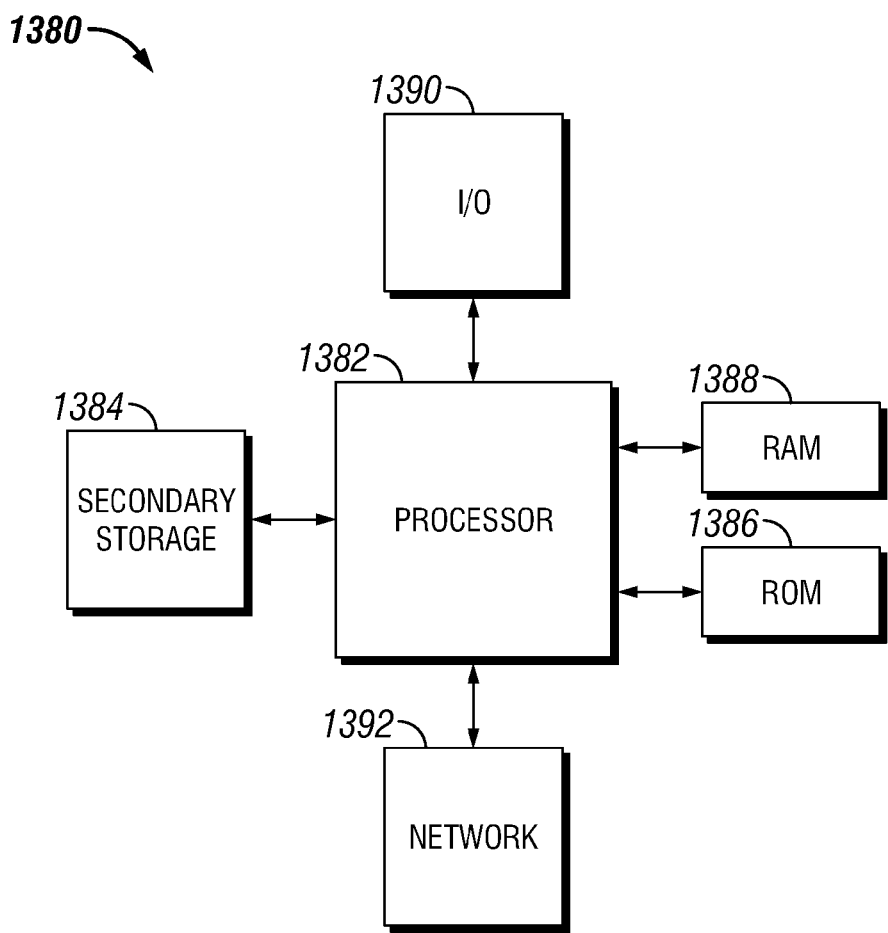
FIG. 9 illustrates an exemplary general purpose computer system suitable for implementing one or more embodiments of the disclosure.

The system described above may be implemented on any general-purpose computer with sufficient processing power, memory resources, and network throughput capability to handle the necessary workload placed upon it. FIG. 9 illustrates a typical, general-purpose computer system suitable for implementing one or more embodiments disclosed herein. The computer system 1380 includes a processor 1382 (which may be referred to as a central processor unit or CPU) that is in communication with memory devices including secondary storage 1384, read only memory (ROM) 1386, random access memory (RAM) 1388, input/output (I/O) devices 1390, and network connectivity devices 1392. The processor may be implemented as one or more CPU chips.

The secondary storage 1384 is typically comprised of one or more disk drives or tape drives and is used for non-volatile storage of data and as an over-flow data storage device if RAM 1388 is not large enough to hold all working data. Secondary storage 1384 may be used to store programs which are loaded into RAM 1388 when such programs are selected for execution. The ROM 1386 is used to store instructions and perhaps data which are read during program execution. ROM 1386 is a non-volatile memory device which typically has a small memory capacity relative to the larger memory capacity of secondary storage. The RAM 1388 is used to store volatile data and perhaps to store instructions. Access to both ROM 1386 and RAM 1388 is typically faster than to secondary storage 1384.

I/O devices 1390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1392 may enable the processor 1382 to communicate with an Internet or one or more intranets. With such a network connection, it is contemplated that the processor 1382 might receive information from the network, or might output information to the network in the course of performing the above-described method steps. Such information, which is often represented as a sequence of instructions to be executed using processor 1382, may be received from and outputted to the network, for example, in the form of a computer data signal embodied in a carrier wave Such information, which may include data or instructions to be executed using processor 1382 for example, may be received from and outputted to the network, for example, in the form of a computer data baseband signal or signal embodied in a carrier wave. The baseband signal or signal embodied in the carrier wave generated by the network connectivity devices 1392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1382 executes instructions, codes, computer programs, scripts which it accesses from hard disk, floppy disk, optical disk (these various disk based systems may all be considered secondary storage 1384), ROM 1386, RAM 1388, or the network connectivity devices 1392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What we claim as our invention is:

1. A computer-implemented bridge manager tool comprising:
    a checklist component stored as a set of computer instructions on a memory that when executed by a processor itemizes tasks, wherein the tasks include pre-bridge tasks, during-bridge tasks, and post-bridge tasks, and wherein the tasks solve a problem managed via the bridge manager tool, wherein one or more of the pre-bridge tasks include opening a conference bridge;
    a timer component stored as a set of computer instructions on a memory that when executed by a processor tracks an amount of time since the bridge manager tool was launched;
    an application launching component stored as a set of computer instructions on a memory that when executed by a processor links at least one application external to the bridge manager tool with at least one of the during-bridge tasks of the checklist component and launches the at least one application external to the bridge manager tool upon selection of the at least one during-bridge tasks;
    a note taking component stored as a set of computer instructions on a memory that when executed by a processor documents events related to a problem managed via the bridge manager tool, the note taking component used for one or more of the during-bridge tasks;
    a paging component stored as a set of computer instructions on a memory that when executed by a processor sends a page to an individual or group, the paging component launched for one or more pre-bridge tasks;
    a database component stored as a set of computer instructions on a memory that when executed by a processor stores data related to a problem managed via the bridge manager tool, the database component used for one or more post-bridge tasks;
    a documentation access component coupled to the database component for input and storage of data related to a problem managed via the bridge manager tool, the documentation access component used for one or more of the post-bridge tasks; and
    a graphical interface stored as a set of computer instructions on a memory that when executed by a processor displays the checklist component, the timer component, the application launching component, the note taking component, the paging component and the documentation access component.

2. The computer-implemented bridge manager tool of claim 1, wherein the checklist component comprises a plurality of tasks.

3. The computer-implemented bridge manager tool of claim 1, wherein the checklist component comprises an entry field associated with each task, the entry field selected to reflect completion of the task or flagged to signal failure to complete the task within a pre-determined period of time.

4. The computer-implemented bridge manager tool of claim 1, wherein the timer component is operable to associate a time-stamp with the occurrence of an event, and store the time-stamp.

5. The computer-implemented bridge manager tool of claim 1, wherein the timer component comprises a calculation component that calculates a total outage time for an incident.

6. The computer-implemented bridge manager tool of claim 1 wherein the note taking component further stores a note in the database component.

7. The computer-implemented bridge manager tool of claim 1, wherein the paging component is pre-populated with data for paging teams and individuals relevant to the problem.

8. The computer-implemented bridge manager tool of claim 1, further comprising an alert component, wherein the alert component provides a notification when a necessary participant has failed to join a bridge.

9. A computer-implemented method of problem management, comprising:
    receiving a problem;
    launching a bridge manager tool stored as a set of computer instructions on a memory by executing the set of computer instructions of the bridge manager tool on a processor to centralize problem solving activities relating to the problem;
    performing one or more activities on a problem resolution checklist displayed by the bridge manager tool, the one or more activities include pre-resolution activities, active-resolution activities, and post-resolution activities;
    initiating centralized coordination of the one or more pre-resolution activities to resolve the problem through the bridge manager tool, the one or more pre-resolution activities comprising:
        paging one or more individuals related to resolution of the problem through the bridge manager tool; and
        opening a conference bridge;
    linking at least one of the one or more activities on the problem resolution checklist with one or more applications external to the bridge manager;
    initiating centralized coordination of the one or more active-resolution activities to resolve the problem through the bridge manager tool, the one or more active-resolution activities comprising:
        documenting the activities when performed;
        flagging one or more activities if not performed within a predetermined period of time; and
        launching the one or more applications external to the bridge manager tool for problem resolution upon selection of the at least one of the one or more activities on the problem resolution checklist; and
    initiating centralized coordination of the one or more post-resolution activities to resolve the problem through the bridge manager tool, the one or more post-resolution activities comprising:
        centrally documenting the resolution of the problem through the bridge manager tool.

10. The method of claim 9, wherein the one or more active-resolution activities further comprising documenting the resolution of the problem through note taking during active resolution of the problem through the bridge manager tool.

11. The method of claim 9, wherein the one or more active-resolution activities further comprising accessing a help desk ticket through the bridge manager tool.

12. The method of claim 9, wherein the one or more active-resolution activities further comprising:
    accessing a reporting template through the bridge manager tool;
    populating the reporting template with data relating to the problem; and
    storing the populated reporting template.

13. The method of claim 9, wherein the one or more active-resolution activities comprising further comprising:
    monitoring a first amount of time used to resolve the problem; and
    monitoring a second amount of time used to complete one or more tasks towards resolving the problem.

14. A system, comprising:
    a processor for processing instructions;
    a memory circuit containing the instructions, the memory circuit coupled to the processor;
    a mass storage device for holding a program operable to transfer the program to the memory circuit;
    wherein the program on the mass storage device comprises instructions, the instructions comprising:
        receiving a report that comprises problem information relating to a problem;
        launching a bridge manager tool for centralized coordination of problem resolution activities for resolving the problem, wherein the bridge manager tool comprises:
            a checklist component that itemizes tasks used to solve a problem managed via the bridge manager tool, the tasks including one or more pre-resolution activities and one or more active resolution activities;
            a timer component that tracks a time aspect managed via the bridge manager tool;
            an application launching component that links at least one application external to the bridge manager tool with at least one of the tasks of the checklist component and launches the at least one application external to the bridge manager tool upon selection of the at least one of the tasks;
            a note taking component that documents events related to a problem managed via the bridge manager tool;
            a paging component that sends a page to an individual or group;
            a database component that stores data related to a problem managed via the bridge manager tool;
            a documentation access component coupled to the database component for input and storage of data related to a problem managed via the bridge manager tool; and
            a graphical interface that displays the checklist component, the timer component, the application launching component, the note taking component, the paging component and the documentation access component;
        initiating centralized coordination of the one or more pre-resolution activities to resolve the problem through the bridge manager tool, the one or more pre-resolution activities comprising:
            opening a conference bridge;
        initiating centralized coordination of the one or more active resolution activities to resolve the problem through the bridge manager tool; and
        centrally documenting the pre-resolution activities and the active resolution of the problem through the bridge manager tool.

15. The system of claim 14, wherein the one or more pre-resolution activities further comprising paging one or more individuals related to resolution of the problem through the bridge manager tool.

16. The system of claim 14, wherein the one or more active resolution activities further comprising:

documenting the activities when performed; and flagging one or more activities if not performed within a predetermined period of time.

17. The system of claim 14, wherein the one or more active resolution activities further comprising launching one or more applications external to the bridge manager tool for problem resolution.

18. The system of claim 14, wherein the one or more active resolution activities further comprising documenting the resolution of the problem by note taking during active resolution of the problem through the bridge manager tool.

19. The system of claim 14, wherein the one or more active resolution activities further comprising:

accessing a help desk ticket through the bridge manager tool;

accessing a reporting template through the bridge manager tool;

populating the reporting template with data relating to the problem;

storing the populated reporting template;

monitoring a first amount of time used to resolve the problem; and monitoring a second amount of time used to complete one or more tasks towards resolving the problem.

20. The computer-implemented bridge manager tool of claim 1, wherein the graphical interface displays the checklist component, the timer component, the application launching component, the note taking component, and the documentation access component in a single view.

\* \* \* \* \*